(12) United States Patent  
Williams et al.

(10) Patent No.: US 7,913,120 B2
(45) Date of Patent: Mar. 22, 2011

(54) SELECTIVE DISABLING OF DIAGNOSTIC FUNCTIONS WITHIN A DATA PROCESSING SYSTEM

(75) Inventors: Michael John Williams, Ely (GB); Daniel Kershaw, Cambridge (GB)

(73) Assignee: ARM Limited, Cambridge (GB)

( * ) Notice: Subject to any disclaimer, the term of this patent is extended or adjusted under 35 U.S.C. 154(b) by 455 days.

(21) Appl. No.: 12/068,696

(22) Filed: Feb. 11, 2008

(65) Prior Publication Data
US 2008/0209268 A1 Aug. 28, 2008

(30) Foreign Application Priority Data

Feb. 22, 2007 (GB) .................................. 0703499.4

(51) Int. Cl.
*G06F 11/00* (2006.01)
(52) U.S. Cl. ......................................................... 714/30
(58) Field of Classification Search ...................... 714/30
See application file for complete search history.

(56) References Cited

U.S. PATENT DOCUMENTS

| | | | |
|---|---|---|---|
| 2003/0014643 A1* | 1/2003 | Asami et al. ................... | 713/182 |
| 2004/0143720 A1* | 7/2004 | Mansell et al. ............... | 711/206 |
| 2005/0039039 A1 | 2/2005 | Moyer et al. | |
| 2005/0091520 A1* | 4/2005 | Khan et al. ..................... | 713/194 |
| 2007/0032733 A1* | 2/2007 | Burton .......................... | 600/509 |
| 2007/0220337 A1* | 9/2007 | Itoh et al. ........................ | 714/30 |
| 2008/0263301 A1* | 10/2008 | Mathews et al. .............. | 711/164 |
| 2009/0055612 A1* | 2/2009 | Sibert ............................ | 711/163 |
| 2010/0205477 A1* | 8/2010 | Watson ............................ | 714/2 |

OTHER PUBLICATIONS

Search Report for GB 0703499.4 dated Apr. 23, 2007.

* cited by examiner

*Primary Examiner* — Bryce P Bonzo
(74) *Attorney, Agent, or Firm* — Nixon & Vanderhye P.C.

(57) ABSTRACT

A data processing system 2 has a memory 6 with a memory address space incorporating a plurality of domains, each domain comprising a set of memory addresses as defined by programmable domain specifying data 32. A processor core 8 executes program instructions fetched from the memory 6. Diagnostic control circuitry 20 is responsive to the domain in which a currently executing program instruction is stored to selectively disable diagnostic circuitry 14, 16, 18 used to perform diagnostic functions upon the data processing system 2. The diagnostic control circuitry 20 is responsive to diagnostic-capability-defining data 36 associated with the domains to indicate which diagnostic circuitry 14, 16, 18 is enabled for which domains.

19 Claims, 4 Drawing Sheets

SELECTIVE DISABLING OF DIAGNOSTIC FUNCTIONS WITHIN A DATA PROCESSING SYSTEM

BACKGROUND OF THE INVENTION

1. Field of the Invention

This invention relates to the field of data processing systems. More particularly, this invention relates to the selective disabling of diagnostic functions within data processing systems.

2. Description of the Prior Art

It is known to provide data processing systems with diagnostic mechanisms, such as instruction breakpoint mechanisms, data watchpoint mechanisms, tracing mechanisms, code profiling mechanisms and the like, in order to assist in the understanding of the operation of data processing systems, particularly during hardware and software development and debug. Such mechanisms allow the data processing instructions being executed, and the data values being manipulated, to be identified at different execution points in order to gain an understanding of the behaviour of the system. This can be vital in the ability to debug systems and to tune their performance.

A separate trend within data processing systems is the use of such systems in processing secure data. As an example, digital rights management systems are frequently required to control the access to copyrighted material. Such systems may employ cryptographic keys, which are highly sensitive pieces of data. Such keys need to be carefully protected. Whilst the systems employing such sensitive information may be designed to be secure in normal use, a problem arises concerning the diagnostic mechanisms built into such systems. Diagnostic mechanisms so as to be sufficiently versatile and powerful normally have the ability to examine data values and other state information throughout the system with little restriction. However, this could represent a significant security threat if a person was, for example, to use diagnostic mechanisms to read a secure cryptographic key from a system in an unauthorised way.

It is known from U.S. Pat. No. 5,621,886 to provide for the separate enablement of debug events during execution of operating system routines and non-operating system routines. Thus, the system can be provided with a first mode and a second mode and while operating in first mode the processor allows access to additional resources which are not available in the second mode.

It is known from US-A-2004/0260910 to provide a method of controlling a monitoring function of a processor operable in at least two domains, each domain comprising at least one mode. Control values may be set to allow initiation of monitoring functions in the first domain, if its related control value indicates that the monitoring function is allowable in that domain. The first domain may be a secure domain and the monitoring function can be a debug or a trace function. The domains of this system are operational states and not regions of memory address space.

A problem with the above approaches is a lack of flexibility in the way diagnostic operations can be enabled or disabled. This is related to the dichotomy of wishing to provide flexible diagnostic access to the entire system to make debug and analysis easy contrasted with a desire to protect sensitive information (such as cryptographic keys and the nature of program code).

SUMMARY OF THE INVENTION

Viewed from one aspect the present invention provides apparatus for processing data, said apparatus comprising:

a memory addressable with a memory address having a value within a memory address space, said memory address space having a plurality of domains, a domain comprising a set of memory addresses as defined by programmable domain specifying data;

data processing circuitry responsive to program instructions fetched from memory addresses within said memory address space to perform data processing operations;

diagnostic circuitry responsive to one or more signals within said apparatus to perform diagnostic operations generating diagnostic data;

diagnostic function control circuitry responsive to a determination of in which of said plurality of domains a memory address of a program instruction currently being executed is located to selectively disable at least some diagnostic functions of said diagnostic circuitry.

The present technique uses programmable domain specifying data to define domains corresponding to portions of the memory address space and then controls the diagnostic circuitry operation in dependence upon in which domain a memory address of a program instruction currently being executed is located so as to selectively disable at least some diagnostic functions. The programmable nature of the domains allows flexibility in the ways that the diagnostic circuitry can be selectively disabled. As an example, two application programs may be running in the same mode and not be distinguishable thereby mode, but can be arranged to have their code stored in different memory domains such that the diagnostic capabilities can be disabled for one of these application programs whilst being enabled for another.

The present technique is well suited for use within systems including a memory management circuitry responsive to memory page table data defining properties of pages of memory addresses within the memory address space since the programmable domain specifying data can then be part of the memory page table data and reuse many of the mechanisms and techniques already provided and developed for the memory page table data.

In addition to the programmable domain specifying data itself being capable of modification to suit the requirements of particular systems and situations, the flexibility of the technique is further enhanced when the diagnostic function control circuitry is responsive to diagnostic-capability-defining data associated with at least one of the domains and specifying which diagnostic functions are enabled when the memory address of the program instruction currently being executed is located within that domain. In this way, both the domains themselves can be configured and the capabilities within those domains used to fine-tune the diagnostic functions (capabilities) of the system in dependence upon the memory address of the instruction currently being executed.

One particularly useful form of the diagnostic-capability-defining data specifies whether invasive diagnostic functions are permitted and/or whether non-invasive diagnostic functions are permitted. Invasive diagnostic functions are those capable of changing the state of the system upon which they are being performed whereas non-invasive diagnostic functions are not able to change the system state.

It will be appreciated that the present techniques can be used to advantage with a wide range of different diagnostic circuitry. Examples of the circuitry with which the present technique is useful include tracing circuitry, code profiling circuitry, instruction breakpoint circuitry and data watchpoint circuitry. In the context of instruction breakpoint circuitry and data watchpoint circuitry, these are normally used to trigger a diagnostic event and these diagnostic events may be one of halting processing operations to permit debug by an external device and/or triggering a debug exception to trigger execution of debug exception handling code upon the apparatus itself.

Viewed from another aspect the present invention provides apparatus for processing data, said apparatus comprising:

memory means addressable with a memory address having a value within a memory address space, said memory address space having a plurality of domains, a domain comprising a set of memory addresses as defined by programmable domain specifying data;

data processing means for performing data processing operations in response to program instructions fetched from memory addresses within said memory address space;

diagnostic means for performing diagnostic operations generating diagnostic data in response to one or more signals within said apparatus;

diagnostic function control means for selectively disabling at least some diagnostic functions of said diagnostic circuitry in response to a determination of in which of said plurality of domains a memory address of a program instruction currently being executed is located.

Viewed from a further aspect the present invention provides a method of processing data, said method comprising the steps of:

storing data within a memory addressable with a memory address having a value within a memory address space, said memory address space having a plurality of domains, a domain comprising a set of memory addresses as defined by programmable domain specifying data;

in response to program instructions fetched from memory addresses within said memory address space, performing data processing operations with data processing circuitry;

in response to one or more signals within said apparatus, performing diagnostic operations with diagnostic circuitry to generate diagnostic data;

in response to a determination of in which of said plurality of domains a memory address of a program instruction currently being executed is located, selectively disabling at least some diagnostic functions of said diagnostic circuitry with diagnostic function control circuitry.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1A:
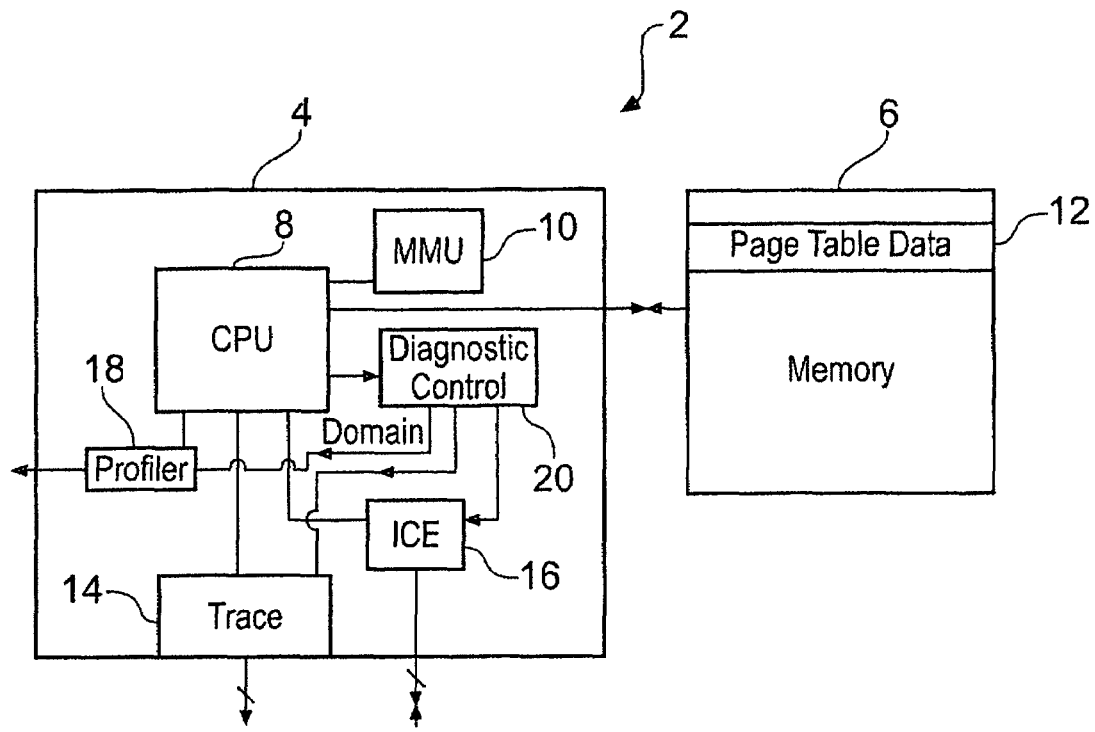
FIGS. 1A and 1B schematically illustrates two example embodiments of a data processing system including diagnostic circuitry that is selectively enabled and disabled.

FIG. 1A illustrates a data processing apparatus 2 comprising an integrated circuit 4 coupled to a memory 6. The integrated circuit 4 includes a processor core 8 for executing program instructions fetched from the memory 6 to perform data processing operations upon data values, which may also be fetched from the memory 6 and stored back into the memory 6. A memory management unit 10 is used to control access to different regions within the memory address space of the memory 6 by the processor core 8. The memory management unit 10 uses page table data 12 stored within the memory 6 to establish permissions and other characteristics associated with the memory address space (e.g. privileged mode only access, cachability, read only status etc). The use of a memory management unit 10 and page table data 12 in this way will be familiar to those in this technical field and will not be described further herein. The page table data 12 may alternatively be provided as part of the integrated circuit 4. The data processing apparatus 2 may also have more than one memory (e.g. separate instruction and data memories (Havard), multiple data memories each with its own address space (e.g. DSP) or other arrangements. Any of these memories may be on or off chip. The page table data could be stored in any of the memories.

Also provided within the integrated circuit 4 are various forms of diagnostic circuitry. In this example, an embedded trace unit 14 provides the ability to trace data processing operations being performed by the processor core 8. An example of such a trace unit would be the ETM units designed by ARM Limited of Cambridge, England. Also provided is an embedded diagnostic unit 16 which provides instruction breakpoint functionality and data watchpoint functionality. This diagnostic unit 16 can be programmed with data to specify the events of interest to a developer such that a diagnostic operation is triggered when such an event occurs. In the case of an instruction breakpoint, the event can be the execution of an instruction having an address matching predetermined characteristics. In the case of a data watchpoint the event can be access to a data value having characteristics matching predetermined characteristics. The diagnostic operations triggered can take a variety of different forms, but typically may be halting of processing operations such that an external device can then examine the state of the integrated circuit 4 for debug purposes or the triggering of a debug exception to initiate execution of debug exception handling code upon the device for itself. The diagnostic unit 16 may have the form of, for example, the ICE unit designed by ARM Limited, Cambridge, England.

Further diagnostic circuitry is provided in the form of a code profiler 18 which is responsive to the program instructions being executed to generate profile information characterising those program instructions. As an example, it may be desired to know the number of times a particular instruction is executed or a particular region of code is executed in order to fine-tune the performance of a data processing system.

Also, provided within the integrated circuit 4 is diagnostic control circuitry 20. This diagnostic control circuitry 20 is responsive to a signal from a processor core 8 indicating the domain of the currently executing program instruction to generate control signals passed to the various diagnostic circuitry 14, 16, 18 to selectively enable or disable the functions of these elements. Thus, for example, when executing one program for which the programmable domain specifying data indicates is in a particular domain and that is known to have no access to secure information, then all of the diagnostic circuitry 14, 16, 18 can have their functions enabled such that problems within such program code can be analysed with full flexibility. In contrast, a different application program may execute from within a different domain where it is known that secure information is present and where it is desirable to disable some or all of the functions of the diagnostic circuitry 14, 16, 18. It may in such circumstances be desirable to disable the trace unit 14 and the diagnostic unit 16 whilst the code profiler 18 can remain active as this is considered incapable of revealing, for example, the value of a secure cryptographic key.

The domain specifying data in this example forms part of the page table data 12 stored within the memory 6. This page table data 12 is accessed via the memory management unit 10 for the purposes previously mentioned. It is known within systems such as the ARM600 processor and later to provide data within the page tables which specifies a domain within the memory address space (i.e. a set of memory addresses). This domain information in its known use is for controlling memory access rights for difference program threads by overriding global access right set in the page table data. The present technique extends the use of the domain specifying data to control the selective disabling of diagnostic circuitry 14, 16, 18 within the data processing system 2.

The page table data 12 read from the memory 6 by the MMU 10 is already integrated into the operation of the processor core 8 to control its memory accessing operations, e.g. enforcing a read only policy for some memory addresses. The page table data for the memory regions which are currently being accessed is normally cached within the integrated circuit 4 so as to be available more rapidly. As part of this information, the domain identifying information is also available. Thus, a domain specifying signal derived from the page table data 12 is passed from the processor core 8 to the diagnostic control circuitry 20. The diagnostic control circuitry 20 then selectively enables or disables the various diagnostic circuits 14, 16, 18 in dependence thereon.

Figure 1B:
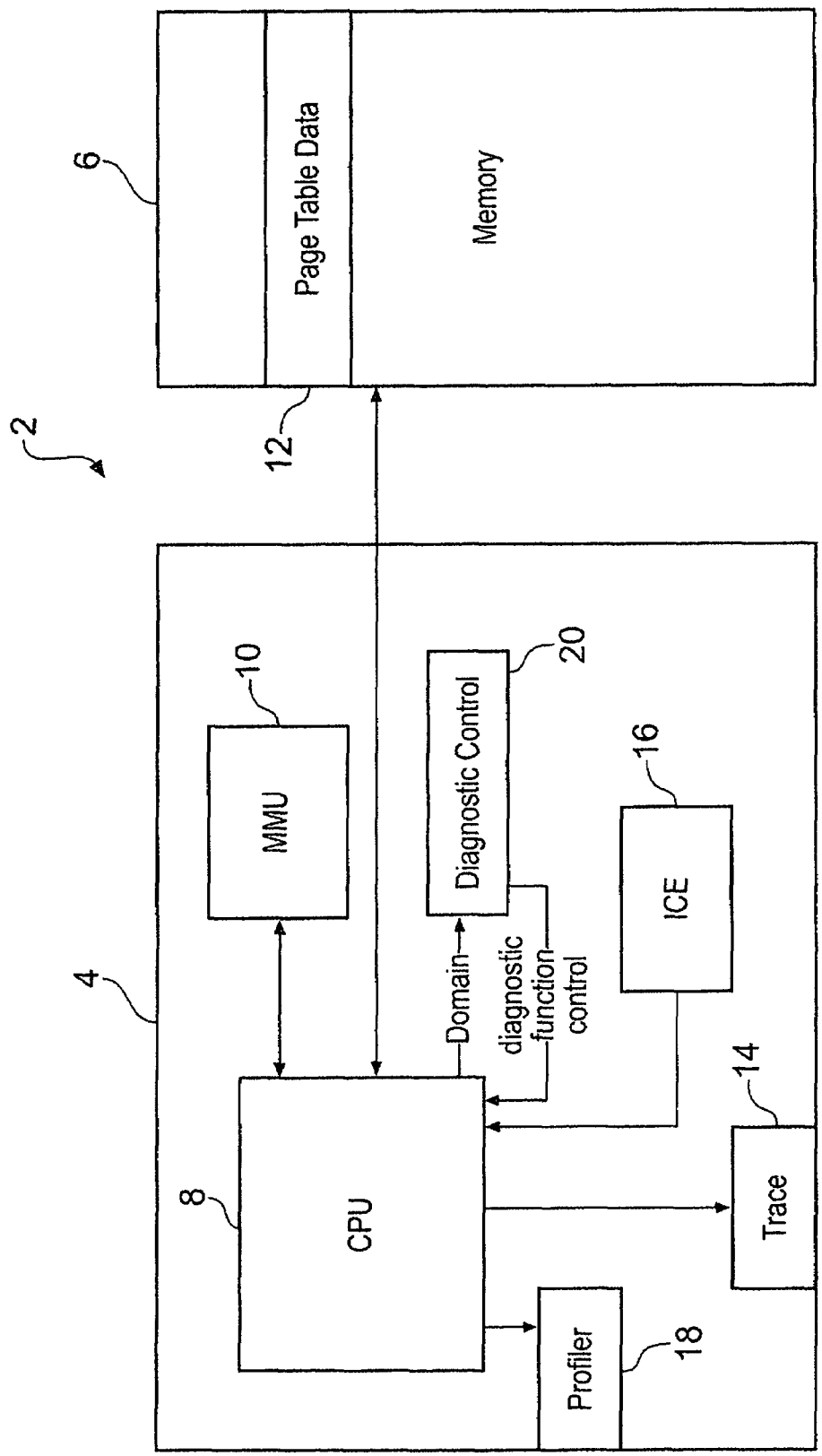

FIG. 1B illustrates another example embodiment differing from that of FIG. 1A in that the diagnostic control circuit 20 generates a signal(s) passed to the processor core 8 to selectively disable the functions of the diagnostic circuits 14, 16, 18.

Figure 2:
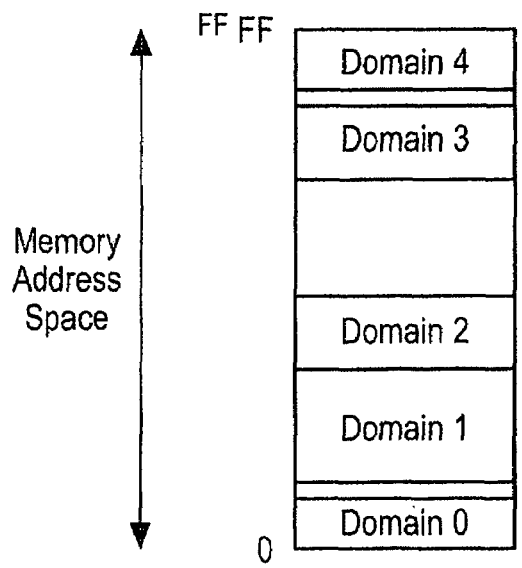
FIG. 2 schematically illustrates the division of memory address space into a plurality of different domains.

FIG. 2 schematically illustrates the memory address space divided into a plurality of different domains. As will be seen, these domains can vary in size and may be contiguous or non-contiguous. The programmable nature of the domain specifying data enables considerable flexibility in the way in which the domains are formed. If desired the domains could be specified down to the level of granularity provided by an individual page table entry. However, it would be more normal to define the domains at a higher level than an individual page table entry, with a reduced level of granularity. It would be unusual for it to be necessary, or worthwhile, to define domains at a finer level of granularity and accordingly the additional overhead associated with storing domain specifying data as part of every page table entry would not be justified.

Figure 3:
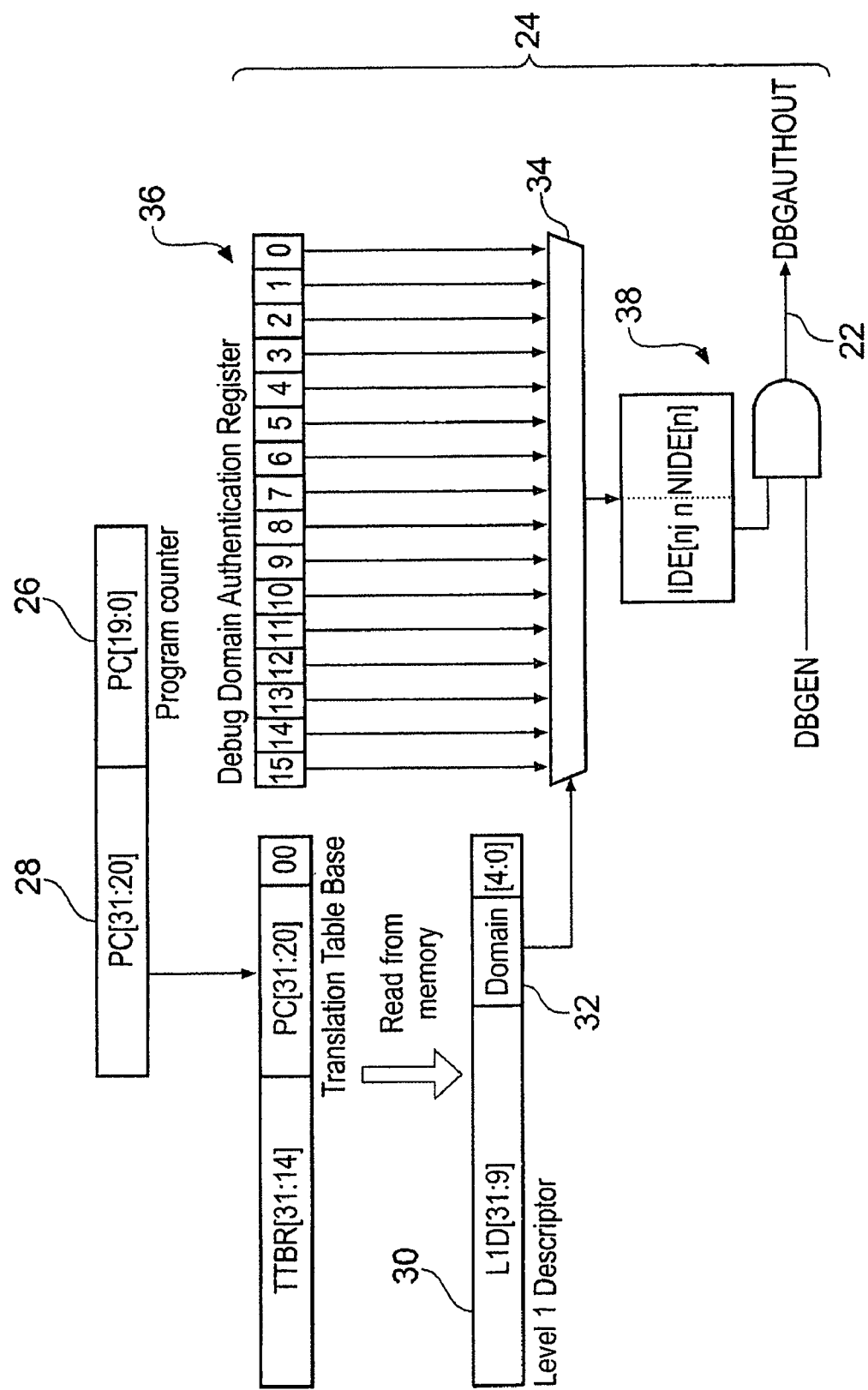
FIG. 3 is a diagram schematically illustrating how page table data and diagnostic-capability-defining data may be combined to selectively enable and disable diagnostic circuitry.

FIG. 3 illustrates schematically an arrangement for generating a diagnostic circuitry enable signal 22 for controlling the selective disabling of the functions of the diagnostic circuits 14, 16, 18. It will be appreciated that a portion 24 of this circuitry will be normally provided within the diagnostic control circuitry 20 whereas the program counter register 26 supplying the memory address of the currently executing program instruction and some other elements will conventionally be found in other parts of the processor core 8. A most significant portion 28 of the memory address of the currently executing program instruction from within the program counter register 26 is used in conjunction with a translation table base register value to index into the page table data 12 to recover a page table entry 30. This page table entry 30 is a conventional ARM page table entry comprising a level 1 descriptor including programmable domain specifying data 32. Lower level descriptors providing a finer level of granularity for defining memory attributes can be provided beneath the level 1 descriptor 30 within the page table data 12 in the conventional way.

The domain specifying data 32 indicates the domain of the program instruction currently being executed and is supplied as a control input to a multiplexer 34. The multiplexer 34 in dependence upon the domain specifying data 32 selects a different one of the diagnostic-capability-defining data values 36 from within a control register. Each one of these diagnostic-capability-defining data values 36 may, for example, be a two bit value with one bit specifying whether invasive debug is permitted and one bit specifying whether non-invasive debug is permitted within that domain. The code profiler 18 and the trace unit 14 provide non-invasive debug, whereas the embedded diagnostic unit 16 is classified as invasive since it has the ability to stop the processor or trigger a debug exception. The diagnostic-capability-defining data for the currently active domain is selected by the multiplexer 34 and output to a plurality of logic circuits 38 which are provided with one for each of the diagnostic circuits 14, 16, 18 (these could also be shared in some embodiments). These logic circuits are then used to generate an appropriate debug control signal 22 for the individual diagnostic circuits 14, 16, 18 in dependence upon the currently output diagnostic-capability-defining data value 36. These are the diagnostic control signals illustrated in FIG. 1 as being supplied from the diagnostic control circuitry 20 to each of the diagnostic circuitry 14, 16, 18. It is also possible that the control signals could be passed to the processor core 8 to selectively disable respective diagnostic functions.

Figure 4:
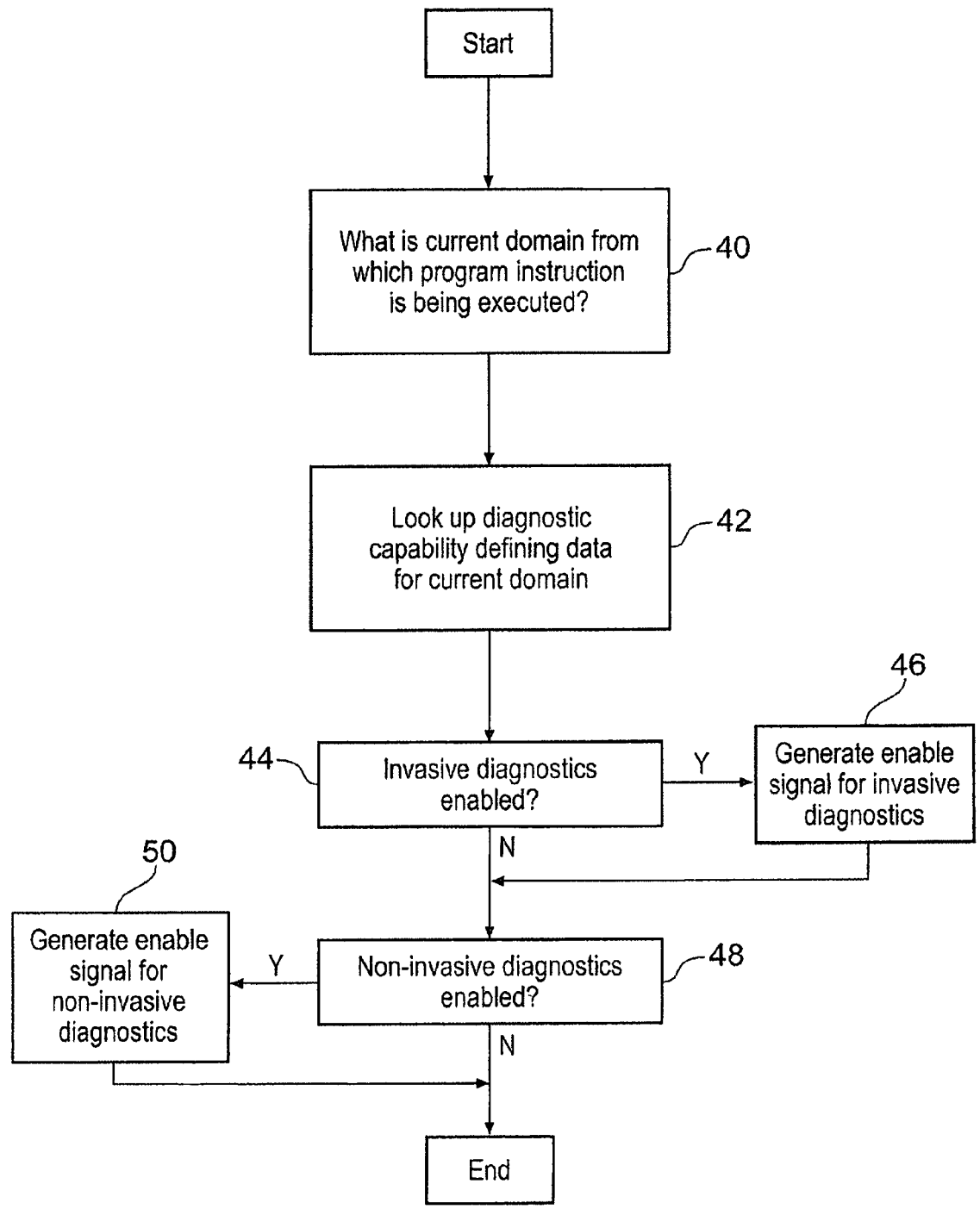
FIG. 4 is a flow diagram schematically illustrating a control flow which may be used when selectively enabling and disabling diagnostic circuitry.

FIG. 4 is a flow diagram schematically illustrating diagnostic operation control. It will be appreciated that the flow diagram of FIG. 4 illustrates the control as a sequential process whereas it will be familiar to those in this technical field that such control could be provided in a variety of different ways with the order changed and/or certain operations performed in parallel or combined. Results or partial results could also be cached. In the illustration of FIG. 4, the processing starts with a determination at step 40 of what is the current domain from which the program instruction is being executed. This can be determined from the page table data 12 and is specified by the domain specifying data 32. Step 42 then looks up the diagnostic-capability-defining data 36 for the current domain from within the control register. This register can be, for example, a programmable configuration coprocessor register (CP15) writeable only when operating in a secure mode. Step 44 determines whether invasive diagnostics are enabled for the current domain. If invasive diagnostics are enabled, then step 46 generates the appropriate enable signal(s) for the relevant diagnostic circuitry 16. Otherwise, step 46 is bypassed. Step 48 determines whether non-invasive diagnostics are enabled for the current domain. If non-invasive operations are enabled for the current domain, then step 50 generates enable signals for the appropriate non-invasive diagnostic circuitry 14, 16, 18. It will be appreciated that the diagnostic unit 16 can be considered to provide both invasive and non-invasive diagnostics since whilst it can alter the state of the system, the diagnostic unit 16 does not have to alter the state of the system. If non-invasive diagnostics are not enabled, then step 50 is bypassed.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for processing data, said apparatus comprising:
   a memory addressable with a memory address having a value within a memory address space, said memory address space having a plurality of domains, a domain comprising a set of memory addresses as defined by programmable domain specifying data;
   data processing circuitry, responsive to program instructions fetched from memory addresses within said memory address space, configured to perform data processing operations;
   diagnostic circuitry responsive to one or more signals within said apparatus, configured to perform diagnostic operations generating diagnostic data;
   diagnostic function control circuitry, responsive to a determination of in which of said plurality of domains a memory address of a program instruction currently being executed is located, configured to selectively disable at least some diagnostic functions of said diagnostic circuitry; and
   memory management circuitry, responsive to memory page table data, configured to define properties of pages of memory addresses within said memory address space, said memory address space containing a plurality of contiguous pages of memory addresses, and wherein said programmable domain specifying data is part of said memory page table data.

2. Apparatus as claimed in claim 1, wherein said diagnostic function control circuitry is responsive to diagnostic-capability-defining data associated with at least one of said plurality of domains and specifying which diagnostic functions are disabled when said memory address of said program instruction currently being executed is located in said at least one of said plurality of domains.

3. Apparatus as claimed in claim 2, wherein said diagnostic-capability-defining data specifies whether invasive diagnostic functions are disabled when said memory address of said program instruction currently being executed is located in said at least one of said plurality of domains.

4. Apparatus as claimed in claim 2, wherein said diagnostic-capability-defining data specifies whether non-invasive diagnostic functions are permitted when said memory address of said program instruction currently being executed is located in said at least one of said plurality of domains.

5. Apparatus as claimed in claim 1, wherein said diagnostic circuitry includes tracing circuitry responsive to data processing operations being executed to generate a stream of trace data.

6. Apparatus as claimed in claim 1, wherein said diagnostic circuitry includes code profiling circuitry responsive to memory addresses of program instructions being executed to generate code profiling data.

7. Apparatus as claimed in claim 1, wherein said diagnostic circuitry includes instruction breakpoint circuitry responsive to a memory address of a program instruction being executed matching a predetermined characteristic to trigger a diagnostic event.

8. Apparatus as claimed in claim 7, wherein said diagnostic event is one of halting processing operations upon said apparatus to permit debug by an external device and triggering a debug exception to initiated execution of debug exception handling code upon said apparatus.

9. Apparatus as claimed in claim 1, wherein said diagnostic circuitry includes data watchpoint circuitry responsive to a memory address of a data value being accessed matching a predetermined characteristic to trigger a diagnostic event.

10. Apparatus for processing data, said apparatus comprising:
    memory means for storing data, said memory means addressable with a memory address having a value within a memory address space, said memory address space having a plurality of domains, a domain comprising a set of memory addresses as defined by programmable domain specifying data;
    data processing means for performing data processing operations in response to program instructions fetched from memory addresses within said memory address space;
    diagnostic means for performing diagnostic operations generating diagnostic data in response to one or more signals within said apparatus;
    diagnostic function control means for selectively disabling at least some diagnostic functions of said diagnostic circuitry in response to a determination of in which of said plurality of domains a memory address of a program instruction currently being executed is located; and
    memory management means for managing memory access, said memory management means, in response to memory page table data, defining properties of pages of memory addresses within said memory address space, said memory address space containing a plurality of contiguous pages of memory addresses, and wherein said programmable domain specifying data is part of said memory page table data.

11. A method of processing data, said method comprising the steps of:
    storing data within a memory addressable with a memory address having a value within a memory address space, said memory address space having a plurality of domains, a domain comprising a set of memory addresses as defined by programmable domain specifying data;
    performing, in response to program instructions fetched from memory addresses within said memory address space, data processing operations with data processing circuitry;
    performing, in response to one or more signals within said apparatus, diagnostic operations with diagnostic circuitry to generate diagnostic data;
    selectively disabling, in response to a determination of in which of said plurality of domains a memory address of a program instruction currently being executed is located, at least some diagnostic functions of said diagnostic circuitry with diagnostic function control circuitry; and
    managing memory accesses with memory page table data defining properties of pages of memory addresses within said memory address space, said memory address space containing a plurality of contiguous pages of memory addresses, said programmable domain specifying data being part of said memory page table data.

12. A method as claimed in claim 11, wherein said selective disabling is responsive to diagnostic-capability-defining data associated with at least one of said plurality of domains and specifying which diagnostic functions are disabled when said memory address of said program instruction currently being executed is located in said at least one of said plurality of domains.

13. A method as claimed in claim 12, wherein said diagnostic-capability-defining data specifies whether invasive diagnostic functions are disabled when said memory address of said program instruction currently being executed is located in said at least one of said plurality of domains.

14. A method as claimed in claim 12, wherein said diagnostic-capability-defining data specifies whether non-invasive diagnostic functions are permitted when said memory address of said program instruction currently being executed is located in said at least one of said plurality of domains.

15. A method as claimed in claim 11, wherein said diagnostic circuitry includes tracing circuitry responsive to data processing operations being executed to generate a stream of trace data.

16. A method as claimed in claim 11, wherein said diagnostic circuitry includes code profiling circuitry responsive to memory addresses of program instructions being executed to generate code profiling data.

17. A method as claimed in claim 11, wherein said diagnostic circuitry includes instruction breakpoint circuitry responsive to a memory address of a program instruction being executed matching a predetermined characteristic to trigger a diagnostic event.

18. A method as claimed in claim 17, wherein said diagnostic event is one of halting processing operations upon said apparatus to permit debug by an external device and triggering a debug exception to initiated execution of debug exception handling code upon said apparatus.

19. A method as claimed in claim 11, wherein said diagnostic circuitry includes data watchpoint circuitry responsive to a memory address of a data value being accessed matching a predetermined characteristic to trigger a diagnostic event.

* * * * *